UNITED STATES PATENT OFFICE.

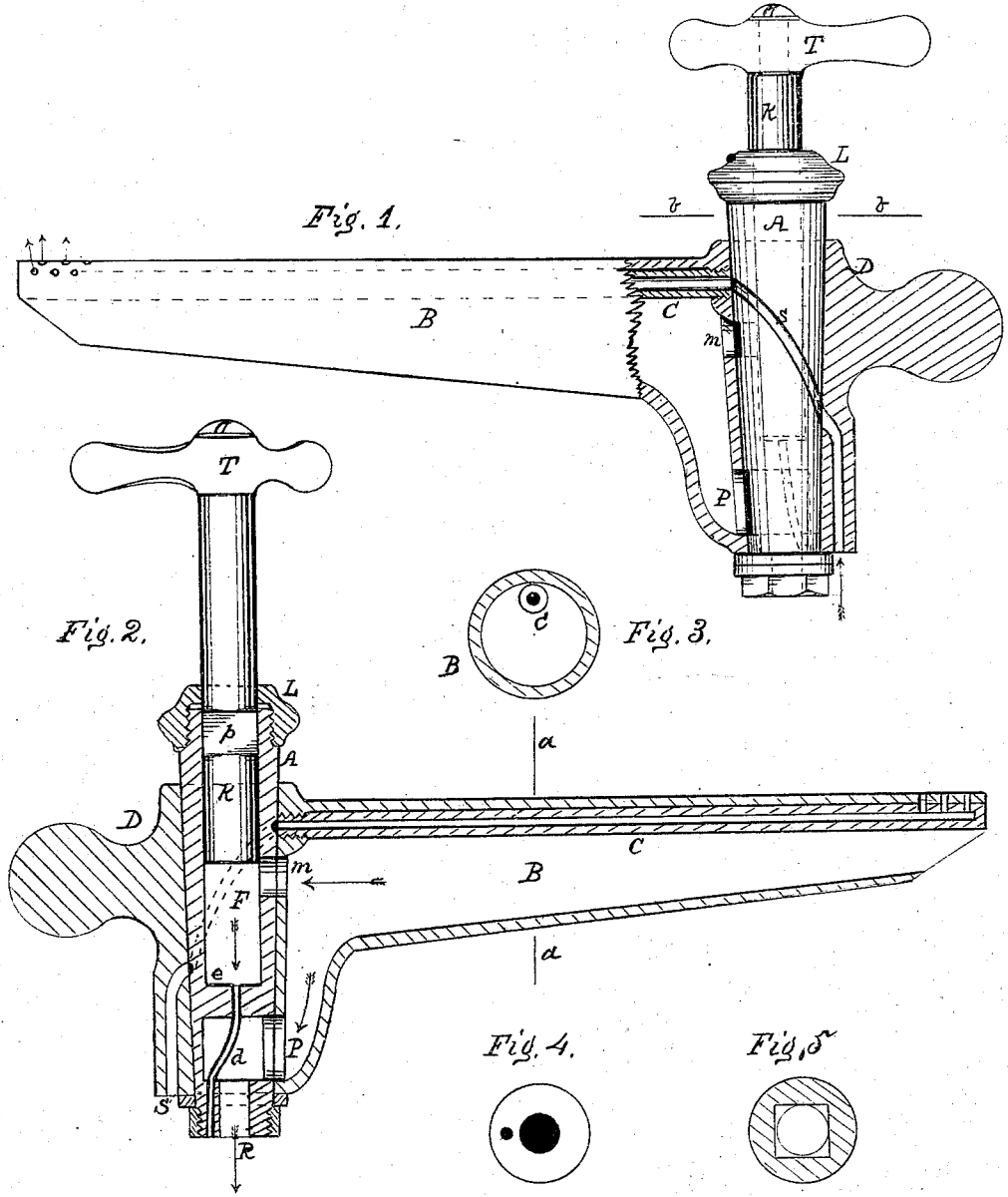

JOHN McKENNA, ALEXANDER McKENNA, AND THOMAS McKENNA, OF PITTSBURG, PENNSYLVANIA.

IMPROVEMENT IN FAUCETS.

Specification forming part of Letters Patent No. 144,213, dated November 4, 1873; application filed August 29, 1873.

*To all whom it may concern:*

Be it known that we, JOHN McKENNA, ALEXANDER McKENNA, and THOMAS McKENNA, of Pittsburg, in the county of Allegheny and State of Pennsylvania, have invented a new and useful Improvement in that class of Faucets used for drawing beer, ale, and similar liquids; our invention will be readily understood by the following description, taken in connection with the accompanying drawings, wherein—

Figure 1 represents a side view of our improved faucet, shown partly in perspective and partly in transverse section; Fig. 2, a longitudinal vertical section of the entire faucet, represented as open and the plunger or piston raised; Fig. 3, transverse section of the tail or shank on the line $a\,a$; Fig. 4, view of the lower end of the key; Fig. 5, transverse section of the upper or large end of the key on the line $b\,b$.

To force or squirt a jet of liquid through a contracted opening in the faucet, either before or after the faucet is closed, is the principal object of our invention; and to this end we construct our faucet in any of the well-known forms, and of any suitable material; but in order to ventilate the cask through the faucet we prefer to make it similar in shape to that for which a patent was granted to us on the 16th day of September, 1862.

In that faucet the airway led directly through the body of the key; but in this case, and for the purpose of utilizing its interior, the air-channel S is made in the form of a groove passing up and around the outside of the key A, and that portion of said channel leading from the key through the tail B is constructed by soldering or screwing a small pipe, C, therein. The key A is made tubular, slightly tapering on the outside, and secured within the shell D by the usual nut and washer at its lower end. The interior, above its main discharging-orifice P, is divided from the lower part by a partition, $e$, and through this partition a small tube, $d$, extends downward and outside of the chief outlet R. Above this partition $e$ the interior of the key is perfectly cylindrical, forming a smooth chamber, F, for a distance extending to a second opening, $m$, and above that point it is square, as shown in the transverse section, Fig. 5, or it may be any other shape that will answer the purpose. In the upper portion of the key, a plunger, K, furnished with a handle, T, by which it can be turned, is so fitted as to not only turn the key, by a square collar, $p$, which slides in the square of the key, but to operate in an up and down direction, as a piston in the cylindrical chamber F beneath the inlet $m$, so at the proper time, either before or after the closing of the faucet, the fluid that may enter said chamber can be forced or squirted through the small pipe $d$, as by a syringe, and as often as the chamber may be filled, the displacement of the plunger on its upward movement being prevented by its square collar $p$ coming in contact with the cap L screwed onto the top of the key.

Our improved faucet being driven into a cask or other air-tight vessel containing liquid, and the plunger K raised to its full limit, the turning of the handle T will bring the key around so as to simultaneously open the various outlets and air-vent. The air, passing up through the channel S into the cask, will enable the fluid to pour out through the nozzle at the lower end of the key, and at the same time enter and fill the cylindrical chamber F under the piston or plunger K, so that on or before the key is brought around to close the faucet the plunger or piston may be forced down, and thereby send the liquid in the piston-chamber F out through the contracted pipe $d$ in a small but forcible stream or jet, by which, if beer or ale is being drawn, a heavy foam or froth will be raised in the glass, and the beer, that would otherwise seem dead or flat, is given a fresh and lively appearance.

We claim—

1. The tubular key A, having therein a transverse partition, $e$, arranged beneath the axial line of the shank B, in combination with a plunger, K, operating entirely above said partition, and with the openings m and P, and the small pipe d, as and for the purposes set forth.

2. A tubular key, A, having fitted therein a plunger, K, in combination with an air-vent, S, extending through the shank B, and down around the outside of the key, and terminating or having its mouth below the piston-chamber, as and for the purposes set forth.

JOHN McKENNA.
ALEX. McKENNA.
THOMAS McKENNA.

Witnesses:
 JOSIAH W. ELLS,
 HAMPTON M'CLURE.